July 30, 1968   E. J. GRIMMER   3,394,455
METHOD OF CONSTRUCTING CAST ELECTRICAL BUSHINGS
Filed March 17, 1967
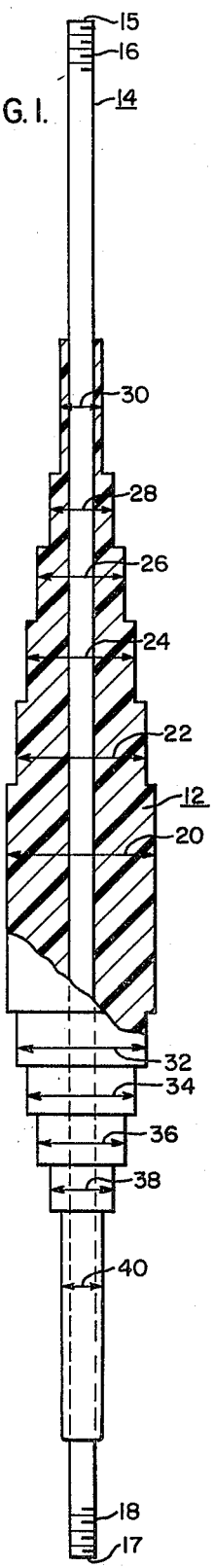
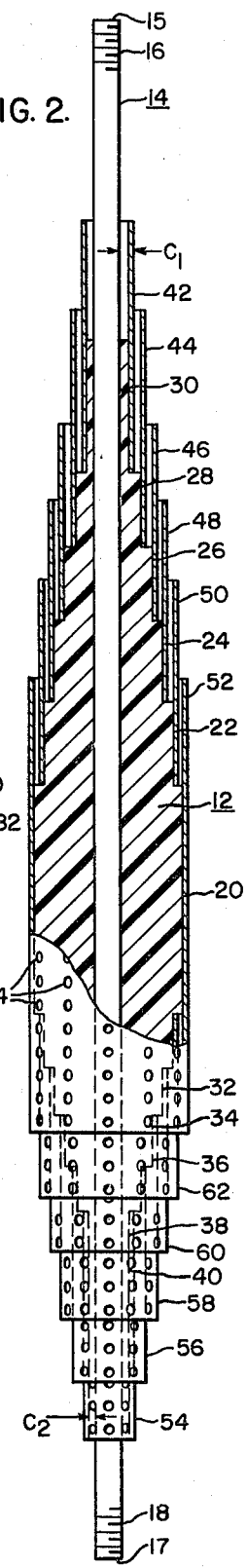
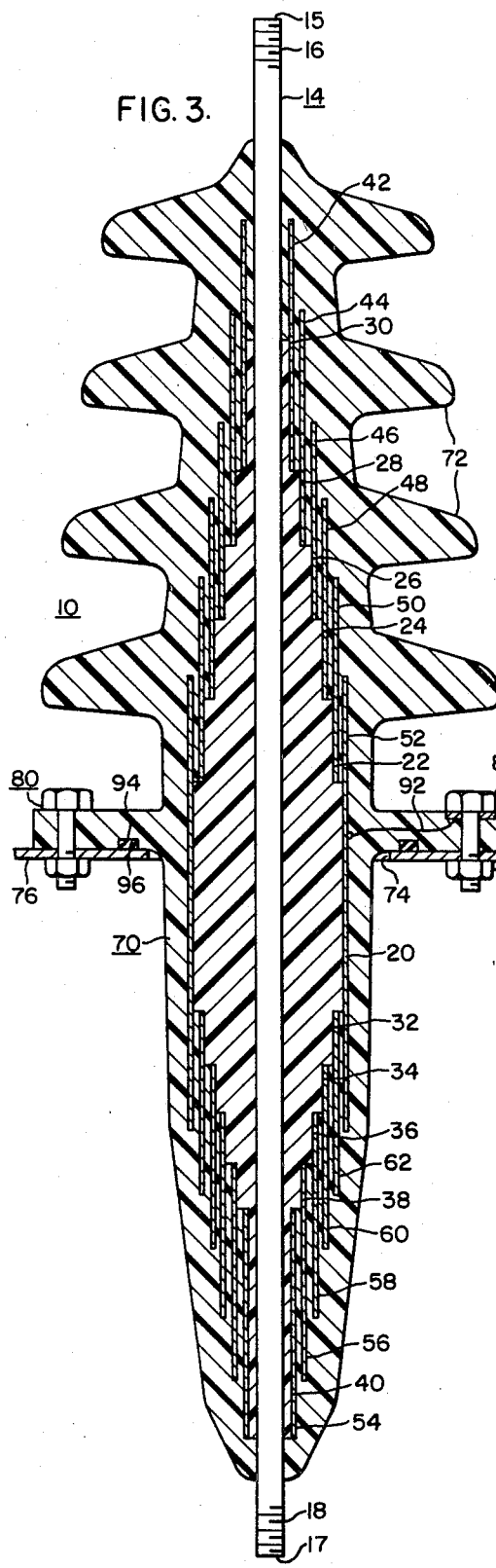

3,394,455
METHOD OF CONSTRUCTING CAST ELECTRICAL BUSHINGS
Elmer J. Grimmer, Sharpsville, Pa., assignor to Westinghouse Electric Corporation, Pittsburgh, Pa., a corporation of Pennsylvania
Filed Mar. 17, 1967, Ser. No. 623,854
10 Claims. (Cl. 29—631)

ABSTRACT OF THE DISCLOSURE

This invention relates to a method of constructing cast, condenser type electrical bushings, wherein the introduction of the tubular electrically conductive members which form the condenser plates is facilitated by a two-step casting procedure. The first casting step forms a first body portion about the inner electrically conductive member of the bushing, which is then used to position and hold the tubular conductive members. The second casting step forms a second body portion which completes the bushing.

---

Condenser type bushings for power apparatus conventionally include a built-up, oil impregnated, or resin bonded, capacitor section comprising layers of paper and interleaved layers of metallic foil. The capacitor section is assembled within a metallic mounting flange, and upper and lower porcleain type housings, with the space between the capacitor portion and the porcelain housings, commonly being filled with oil. While this type of construction provides good electrical characteristics, it is relatively costly to manufacture due to the large plurality of parts which must be manufactured and assembled. Care must also be taken to protect the porcelain housings from sharp blows, and other mechanical shocks, as they are fragile. Further, the oil presents problems, including the hazard of fire. Thus, it would be desirable if condenser type electrical bushings for electrical power apparatus, such as transformers and circuit breakers, could be constructed without the built-up type of oil impregnated capacitor section, without the necessity of utilizing fragile porcelain housings, and without oil, if the resulting bushing structure may be manufactured at a lower cost, and without sacrificing electrical and mechanical characteristics.

Accordingly, it is an object of the invention to provide a new and improved method of constructing condenser type electrical bushings.

A further object of the invention is to provide a new and improved method of constructing condenser type electrical bushings which provides a bushing structure which is less complicated and less costly than prior art porcelain type condensed bushings.

Another object of the invention is to provide a new and improved method of constructing condenser type electrical bushings, which eliminates the built-up, paper type capacitor section, the porcelain housings, and the insulating oil of certain prior art types of bushing construction, and wherein the bushing structure formed by the method is electrically and mechanically superior to said prior art bushings.

Briefly, the present invention accomplishes the above cited objects by a new and improved method of constructing electrical bushings, wherein a first body portion of resinous insulating material is cast about the central electrically conductive member of the bushing. The outer diameter of the first body portion is decreased in steps, starting from a maximum diameter at a location intermediate the ends of the central electrically conductive member, and progressing in discrete steps of decreasing diameter towards both ends of the bushing. Electrically conductive tubular members, formed of material such as metallic foil, are telescoped over the various outer diameters of the first body portion, created by the steps with the tubular electrically conductive members extending longitudinally outward from its associated step to overlap at least one tubular electrically conductive member of a lower step, and provide capacitor "plates" and predetermined capacitive relationships between the various tubular conductive members. A second body portion of resinous insulating material is then cast about the first body portion and the tubular electrically conductive members, with the resinous material of the second body portion filling in the spaces between the overlapping tubular conductive members, and surrounding the tubular electrically conductive members.

Further objects and advantages of the invention will become apparent from the following detailed description, taken in connection with the accompanying drawings, in which:

FIGURE 1 illustrates a manufacturing step in the assembly of an electrically insulating bushing according to the teachings of the invention, showing an elevational view, partially in section, of the central electrically conductive portion and first cast body portion of the bushing;

FIG. 2 illustrates another manufacturing step in the asembly of an electrical insulating bushing according to the teachings of the invention, subsequent to the manufacturing step shown in FIG. 1; and FIG. 3 is an elevational view, in section, of an electrical insulating bushing which may be constructed according to the teachings of the invention, and also illustrating the final manufacturing step of the disclosed method.

In general, the invention relates to a new and improved method of manufacturing electrical insulating bushings of the condenser type, in which a two step casting procedure, and axially and radially spaced capacitor plates, facilitate the construction of the bushing. This concept is exemplified in the accompanying drawings, in which FIGS. 1 and 2 illustrate steps in the manufacture of the electrical insulating bushing 10 shown in FIG. 3.

The first step of the method, shown in FIG. 1, comprises casting a first body portion 12 of resinous insulating material about an elongated electrically conductive member 14, which forms the inner electrical conductor of bushing assembly 10. Electrically conductive member 14 may be formed of copper, aluminum or any other good electrical conductor, and has first and second ends 15 and 17, respectively. The ends 15 and 17 of electrically conductive member 14 may be adapted to cooperate with suitable fastening means for connecting electrically conductive member 14 with electrical conductors of the external electrical system, and the electrical apparatus associated with the bushing. For example, ends 15 and 17 may be threaded as shown at 16 and 18, respectively.

The first body portion 12 of resinous insulating material may be formed of any suitable type of resin, preferably thermosetting, but thermoplastic resin systems may be used if their softening temperatures are above the maximum operating temperature of the electrical bushing. In general, the resin of which body portion 12 may be made should be mechanically strong, weather resistant, have a low shrinkage factor upon curing, provide good adhesion to metal inserts, and have excellent crack resistance upon thermal cycling. The resinous polymeric epoxides have been found to be excellent.

The resin systems selected may be filled with suitable finely divided, inorganic fillers, to obtain nontracking characteristics, to reduce shrinkage upon curing of the resin, to more closely match the coefficient of thermal expansion of the resin system with the metallic inserts therein, and to provide other desirable characteristics.

Suitable fillers which may be used are alumina trihydrate ($Al_2O_3 \cdot 3H_2O$), quartz, and silica. If the resulting resin system and metallic inserts do not provide the necessary correlation in thermal expansion, shrinkage voids may be directed to predetermined electrically shielded locations which do not adversely affect the mechanical strength of the assembly, using techniques such as those disclosed in copending application Ser. No. 544,757, filed Apr. 25, 1966, which is assigned to the same assignee as the present application.

The first body portion 12 is cast in a mold which provides a plurality of "steps" in its outer diameter, with the maximum diameter 20 being appropriately located relative to the ends of electrically conductive member 14, and stepping to successively smaller diameters toward each of its ends 15 and 17. For example, as shown in FIG. 1, body portion 12 steps to successively smaller diameters 22, 24, 26, 28 and 30 towards end 15, and to successively smaller diameters 32, 34, 36, 38 and 40 towards end 17. As will be hereinafter explained in greater detail, each discrete step is used to locate and secure a tubular electrically conductive member, which forms a plate for capacitively distributing electrical stress substantially uniformly throughout the insulating bushing. Equal capacitance between the plates will make the voltage or electrical stress between the plates equal, which allows the electrical stress to be distributed across the insulation of the bushing, and prevents it from concentrating at one point. Thus, the magnitude of the radially stepped increments which form the steps, and the longitudinal length of each step, are determined according to the particular capacitive relationship desired.

The stepped configuration from the maximum diameter 20 to end 15, may be similar in dimensions to the stepped configuration from maximum diameter 20 to end 17, or, as shown in FIG. 1, they may have different dimensions. For example, if a substantial portion of end 17 of bushing assembly 10 will extend into an insulating fluid dielectric, such as oil, within the tank or casing of the associated electrical apparatus, the stepped configuration adjacent end 17 may be different than the stepped configuration on the other end of the bushing assembly, which will etend into air, due to the different insulating strengths of oil and air. In general, the radially stepped increments will preferably have the same magnitudes on each end of the bushing assembly, but the longitudinal lengths of the steps may be different on the two ends of the bushing, especially if one end of the bushing assembly will be inserted into an insulating dielectric fluid. Since the end of the electrical bushing which would be inserted into the insulating dielectric fluid may be substantially shorter than the remaining end, the longitudinal or axial length of the steps may be correspondingly shorter.

After the electrically conductive member 14 is centrally located within a casting mold, and a viscous resin system is introduced into the mold, and cured to form the cast solid body portion 12, the mold may be removed and the bushing sub-assembly shown in FIG. 1 is ready for the manufacturing step of placing and securing the tubular capacitor plates or conductive members, which are shown in FIG. 2. Like reference numerals in FIGS. 1 and 2, as well as FIG. 3, indicate like components.

The plates of the capacitors are formed of sheets or foils of electrically conductive material. The electrically conductive material may be an excellent conductor of electricity, such as copper or aluminum, it may be partially conductive, such as a carbon impregnated sheet member of suitable strength, or it may be semi-conductive, i.e., having a voltage dependent resistivity, such as a sheet member impregnated with finely divided particles of silicon carbide. The width of the electrically conductive sheets will be sufficient to encircle the diameter of its associated step on cast body portion 12, and its length will be predetermined to provide the necessary surface to adequately secure it to its associated step, and to provide the desired overlap relative to other plates of the capacitor structure. The thickness of the sheets of electrically conductive material, which are formed into the tubular capacitor plates, is primarily determined by the strength of the resulting cylindrical, tubular structure. In other words, the thickness of the tubular electrically conductive members will be determined to provide the strength necessary for the resulting tubular structure to maintain its dimensions while extending outwardly in space, in an axial direction from its associated step, during the introduction of a casting resin in the second casting step, which will be hereinafter explained.

More specifically, the first discrete step starting at end 15, which is formed by a diameter 30, will have an electrically conductive tubular member 42 disposed thereon. Since tubular member 42 does not have to overlap a foil associated with a smaller diameter, the first discrete step may have a longitudinal length sufficient to accommodate the complete length of the tubular member 42, or, as shown in FIG. 2, it may extend longitudinally or axially outward from the step for a predetermined distance. The dimensions of tubular member 42 are selected to provide a predetermined capacitance C1 between itself and electrically conductive member 14.

Electrically conductive tubular member 42 may be preformed into a tubular, cylindrical configuration having an inside diameter substantially the same as diameter 30, which is then merely telescoped into position over this step, or it may be in the form of sheet or foil which is wrapped around diameter 30 and secured thereto with suitable adhesive means, such as an epoxy resin adhesive.

In like manner, electrically conductive tubular members 44, 46, 48, 50 and 52 are disposed to encircle diameters 28, 26, 24, 22 and 20, respectively, with the various tubular members extending longitudinally outward from its associated step for a predetermined distance, to overlap the tubular member below it and provide a capacitance substantially equal to the value of capacitance C1.

The overlapping of the tubular members provides an air space between each two successive tubular members, which will be subsequently filled with resinous insulating means in a later manufacturing step. In order to insure that all the air between the radially spaced, adjacent tubular members is supplanted during the subsequent casting operation, the tubular members should preferably have a plurality of small perforations or openings therein, such as openings 64 shown in tubular member 52. Openings 64, in addition to facilitating the removal of air between radially adjacent tubular members, also improve the bond between the tubular members and the resinous insulating system which is subsequently cast about the tubular members, and they also help prevent shrinkage cracks.

In like manner, tubular electrically conductive members 54, 56, 58, 60 and 62 are circumferentially disposed about diameters 40, 48, 36, 34 and 32, respectively, with the capacitance formed between each radially adjacent pair of tubular members being substantially equal to capacitance C2, which is the magnitude of the capacitance between electrically conductive member 14 and tubular member 54. As hereinbefore described, capacitances C1 and C2 may or may not be equal, depending upon the particular insulating bushing design, and its intended application.

It will be noted that the resulting capacitor plate structure differs from that conventionally used in condenser type bushings, in that the plates of the capacitor, except for the outer plate, are axially separated, instead of being continuous. This split or double capacitor structure, however, provides excellent radial and longitudinal distribution of electrical stress, and is usually not utilized in conventional "built-up" types of condenser bushings formed of paper and sheets of electrically conductive foil, because it would be more difficult and costly to manufacture.

The next manufacturing step which is shown in FIG. 3, is the casting of a second body portion 70 of resinous insulating material about the first body portion 12, including the plurality of tubular electrically conductive members which have been pre-positioned on the various discrete steps of the first body portion, as shown in the manufacturing step of FIG. 2. The second cast body portion 70 is preferably formed of the same resinous insulating material of which the first body portion 12 is formed, but any other suitable resinous insulating materials may be used which have similar coefficients of thermal expansion. The resinous insulating system should have a viscosity range which will allow it to completely fill the spaces between radially adjacent tubular conductive members.

The water sheds or corrugations 72 on the "weather end" of bushing assembly 10 may be integrally cast with the second body portion 70; or, the weather end of the bushing may be cast smooth and the corrugations supplied by telescoping a resilient externally corrugated weather sleeve over the bushing. The resilient weather sleeve, formed of material such as butyl rubber, may also be used to provide the mold for the second cast body portion on the weather end of the bushing. The weather sleeve may also be of the porcelain type, if desired, in which case a resilient member should be disposed between the second body portion 70 and the porcelain weather housings, in order to supplant any air, and to allow expansion of bushing assembly 10 without cracking the porcelain.

Mounting means 80 for securing the bushing assembly 10 in the desired fixed position relative to an opening 74 in the casing 76 of its associated electrical apparatus, may be cast into the bushing assembly 10 at the time the second body portion 70 is cast. Mounting means 80 includes a circumferential flange 82 disposed perpendicular to the axis of the bushing, at a predetermined location between the ends 15 and 17 of bushing assembly 10, with any suitable fastening means, such as nut 84 and bolt 86 cooperating with openings in the flange 82 and the casing 76. Flange 82 may be formed of the same material as the second body portion 70, as illustrated in FIG. 3, or it may be metallic, being suitably disposed within the mold and cast into fixed position when the second cast body portion 70 is cast.

The outer tubular conductive member 52 should be grounded to the casing 76. If the flange 82 is formed of the cast insulating material, the grounding may be accomplished by connecting tubular conductive member 52 to a metallic insert 90, via electrical conductor 92, with the metallic insert 90 either being disposed to contact casing 76 directly, or, as shown in FIG. 3, disposed about one of the openings in the flange in order to contact bolt 86, which will then complete the electrical path to casing 76. If bolt 86 completes the electrical path, various checks on the bushing insulation, such as power factor tests on the bushing, may be made by merely removing bolt 86 and using the insert 90 as a test or probe contact point.

A circumferential groove 94 may be cast, or machined into the portion of mounting flange 82 which rests against casing 76, and a suitable resilient gasket member 96 may be disposed therein to seal opening 74 when bushing assembly 10 is in the desired assembled relation with casing 76.

If mounting flange 82 is metallic, tubular electrically conductive member 52 may be connected directly to the metallic flange, or, the separate outer tubular electrically conductive member 52 may be completely eliminated, and replaced by constructing the metallic flange with an integral tubular, cylindrical portion, which functions in the same manner as the outer tubular electrically conductive member 52.

In summary, there has been disclosed a new and improved method of constructing electrical condenser type bushings, by forming a first cast body portion, and using the first cast body portion to position and mechanically secure tubular electrically conductive members which form the plates of a split or double type capacitor structure. This method, compared with the method of constructing conventional condenser bushing structures formed of a built-up capacitor section of interleaved paper turns and turns of metallic foil, which is enclosed within a metallic flange portion and upper and lower porcelain housings, has many advantages. The disclosed method reduces manufacturing time, manufacturing cost, and it provides a bushing assembly that has smaller dimensions and less weight than those formed by prior art methods. Further, these advantages are accomplished while improving the electrical characteristics and the mechanical strength of the bushing assembly. Still, further, an electrical bushing constructed according to the disclosed method completely eleminates the need for filling the bushing assembly with an insulating oil, which reduces fire hazard, and the bushing may be mounted at any angle.

Since numerous changes may be made in the above described apparatus and different embodiments of the invention may be made without departing from the spirit thereof, it is intended that all matter contained in the foregoing description or shown in the accompanying drawings, shall be interpreted as illustrative, and not in a limiting sense.

I claim as my invention:

1. A method of constructing an electrical bushing assembly comprising the steps of:
   casting a first body portion of resinous insulating material about an electrically conductive member having first and second ends, with the outer diameter of said first body portion of resinous insulating material decreasing in discrete steps having predetermined axial lengths and outer diameters, starting from a maximum diameter at a location intermediate the ends of the electrically conductive member, and progressing in discrete steps of decreasing diameter towards its first and second ends,
   disposing an electrically conductive tubular member about each of the outer diameters of said first body portion of resinous insulating material formed by said discrete steps, with at least certain of said electrically conductive tubular members extending axially outward from its associated discrete step to overlap in spaced relation at least one other electrically conductive tubular member, and provide predetermined capacitive relationships between said electrically conductive tubular members,
   and casting a second body portion of resinous insulating material about the first body portion of resinous insulating material, and about said electrically conductive tubular members, with said second body of resinous insulating material also filling the spaces between said overlapped electrically conductive tubular members.

2. The method of claim 1 wherein at least certain of said electrically conductive tubular members are perforated to facilitate the filling of the spaces between said overlapped electrically conductive tubular members with the resinous insulating material of which said second body portion is formed.

3. The method of claim 1 wherein the step of casting said second body portion includes forming a mounting flange of said resinous insulating material intermediate the ends of said electrically conductive member.

4. The method of claim 1 wherein said second body portion has a plurality of corrugations cast integrally therein, adjacent at least one of the ends of said electrically conductive member.

5. The method of claim 1 wherein the step of casting said second body portion also includes the steps of forming a mounting flange of said resinous insulating material intermediate the ends of said electrically conductive member, forming a plurality of openings in said mounting flange, disposing a metallic grounding member about at least one of the openings in the flange, located to connect the metallic grounding member to the casing of the apparatus that the electrical bushing will be associated with when metallic fastening means are inserted into the flange opening, and electrically connecting the outermost electrically conductive tubular member to said metallic grounding member.

6. The method of claim 1 including disposing a metallic mounting flange about said first body portion, prior to the casting of said second body portion, and securing the mounting flange in the desired position by embedding a portion of the mounting flange in the resinous insulating material which forms said second body portion.

7. The method of claim 5 including electrically connecting the outermost electrically conductive tubular member to said metallic mounting flange, prior to the casting of said second body portion.

8. The method of claim 5 wherein the metallic mounting flange includes a tubular cylindrical portion which forms the outer grounded plate of the capacitive portion of the electrical bushing.

9. The method of claim 1 including the step of disposing at least one end of the cast first and second body portions within a weather sleeve.

10. The method of claim 9 wherein the weather sleeve is, at least in part, constructed of porcelain.

References Cited

UNITED STATES PATENTS

| 3,005,868 | 10/1961 | Linderholm | 174—143 X |
| 3,265,799 | 8/1966 | McWhirter | 264—272 X |

FOREIGN PATENTS

| 772,054 | 4/1957 | Great Britain. |
| 1,389,463 | 1/1965 | France. |

ROBERT F. WHITE, *Primary Examiner.*

T. J. CARVIS, *Assistant Examiner.*